(12) United States Patent
Gessner et al.

(10) Patent No.: US 12,736,712 B2
(45) Date of Patent: Sep. 15, 2026

(54) AUTOMATED METHOD FOR OPTIMIZING ADJUSTMENT FACTORS OF FLOW MODELS

(71) Applicant: Petróleo Brasileiro S.A.—Petrobras, Rio de Janeiro (BR)

(72) Inventors: Tobias Rudolfo Gessner, Vitória (BR); Livia Fulchignoni De Paiva, Rio de Janeiro (BR)

(73) Assignee: Petróleo Brasileiro S.A.—Petrobras, Rio de Janeiro (BR)

( * ) Notice: Subject to any disclaimer, the term of this patent is extended or adjusted under 35 U.S.C. 154(b) by 573 days.

(21) Appl. No.: 18/069,823

(22) Filed: Dec. 21, 2022

(65) Prior Publication Data

US 2023/0204817 A1 Jun. 29, 2023

(30) Foreign Application Priority Data

Dec. 23, 2021 (BR) ...................... 10 2021 026238 9

(51) Int. Cl.
*G01V 20/00* (2024.01)
*E21B 43/12* (2006.01)
(Continued)

(52) U.S. Cl.
CPC ............ *G01V 20/00* (2024.01); *E21B 43/122* (2013.01); *E21B 47/10* (2013.01); *E21B 2200/00* (2020.05);
(Continued)

(58) Field of Classification Search
CPC ...... G01V 20/00; G01V 2210/66; G01V 1/50; G01V 3/38; G01V 1/345; E21B 43/122;
(Continued)

(56) References Cited

U.S. PATENT DOCUMENTS 5,550,761 A 8/1996 Pauchon et al.
10,409,929 B2 9/2019 Johansen
(Continued)

OTHER PUBLICATIONS

Wikipedia ("Ordinary least squares." Wikipedia, The Free Encyclopedia. Wikipedia, The Free Encyclopedia, Dec. 3, 2021) (Year: 2021).*

*Primary Examiner* — Christian T Bryant
(74) *Attorney, Agent, or Firm* — Morrison & Foerster LLP

(57) ABSTRACT

The present invention consists of a method of automatic adjustment of multiphase flow models using the principle of least squares in the correction of the systematic error of simulated pressure drop and temperature drop values. This has been implemented and automated in the form of a computational algorithm and applied in the case study of an actual Production System using Marlim II simulator. For all four multiphase flow correlation sets considered, the adjustments followed each other stably, converging after a few iterations. At the end of the activity, the four sets were found to perform better than the best unadjusted set of correlations. In addition, the method provides consistent results, which is an advantage over the manual adjustment method.
Accordingly, the present invention has drastically reduced the time required for optimizing the adjustment factors of flow models and has improved quality of the adjusted model as compared to the final model obtained with manual adjustment. By better quality of the model is meant that the simulated results are closer to the measured results, that is, the model is more capable of representing the flow dynamics verified in the field. In cases with a high number of operating spots in the real system, reduction in the time required by the activity is even more significant.

6 Claims, 3 Drawing Sheets

(51) Int. Cl.
*E21B 47/10* (2012.01)
*G01V 1/34* (2006.01)
*G01V 1/50* (2006.01)
*G01V 3/38* (2006.01)

(52) U.S. Cl.
CPC .......... *E21B 2200/20* (2020.05); *G01V 1/345* (2013.01); *G01V 1/50* (2013.01); *G01V 3/38* (2013.01); *G01V 2210/66* (2013.01)

(58) Field of Classification Search
CPC ... E21B 2200/20; E21B 2200/00; E21B 47/10
See application file for complete search history.

(56) References Cited

U.S. PATENT DOCUMENTS

| | | | | |
|---|---|---|---|---|
| 2010/0138196 | A1* | 6/2010 | Hui | E21B 49/00 703/1 |
| 2014/0343909 | A1 | 11/2014 | Guerillot | |
| 2018/0260503 | A1* | 9/2018 | Dweik | G06N 7/023 |
| 2022/0114302 | A1* | 4/2022 | Skripkin | G06N 20/20 |

* cited by examiner

AUTOMATED METHOD FOR OPTIMIZING ADJUSTMENT FACTORS OF FLOW MODELS

CROSS-REFERENCE TO RELATED APPLICATION

This application claims priority to Brazilian Application No. BR 10 2021 026238 9, filed on Dec. 23, 2021, and entitled "AUTOMATED METHOD FOR OPTIMIZING ADJUSTMENT FACTORS OF FLOW MODELS," the disclosure of which is incorporated herein by reference in its entirety.

FIELD OF THE INVENTION

The present invention is related to the field of flow representation, more precisely in multiphase flow models.

DESCRIPTION OF THE STATE OF THE ART

The oil industry has sought to represent flow in its production systems since the 1950s. The simultaneous displacement of a gaseous phase (natural gas) and up to two liquid phases (oil and saline water) is often observed, which is designated s multiphase flow.

Although the models developed for this purpose have grown in complexity and physical basis (Shippen and Bailey, 2012), their precision is still not comparable to that obtained in the representation of single-phase flows. In the meantime, the use of adjustment factors of pressure drop and temperature drop is required to reduce deviations of the simulation model from its respective real system.

Deviations or errors are composed of a systematic and a random portion. Both can be quantified by performing model calibration. However, only the systematic portion is subject to compensation through subsequent model adjustment. In the present work, the systematic error of the model will be assumed to be fully compensated by the linear adjustment of the simulated quantities.

Practice shows that throughout the productive life of Marine Production Systems, their respective flow models must be adjusted periodically. This is due to changes both in their operating conditions (percentage of choke opening, continuous gas-lift injection flow rate, Submersible Centrifugal Pump rotation frequency) and in the properties of the produced fluids (water and natural gas volumetric fractions) and the reservoir (depletion, fouling), which lead to simulation scenarios that had not yet been considered in the calibration step. Naturally, it is expected that the greater the robustness of the model, the smaller the periodicity and variation of these new adjustments.

If carried out manually, such an activity takes too much time and is proportional to the number of items considered in the production history. On the other hand, the sequence of procedures to be followed in the form of a computational algorithm can be implemented, hence reducing the time required for the adjustment without compromising quality of the results.

Several possibilities of algorithms exist for optimizing the adjustment factors of the multiphase flow simulation model. The present invention provides a computationally efficient method that is based statistically on the principle of the least squares. The authors are unaware of a similar methodology published in the literature. The method is demonstrated in a case study of an actual Production System using the Marlim II simulator. The invention has as its field of application all models for simulating the flow of Petrobras' producing and injecting wells.

Oil flow from the production wellbore to the Stationary Production Unit (SPU) is analytically modeled from momentum and energy conservation equations. The same applies to the flow of injector fluids from the SPU to the injector wellbore. At Petrobras all producing wells have a respective a flow simulation model with the aim of predicting production anomalies, quantifying the well production potential, identifying opportunities for optimizing production, enabling production to be apportioned, among others. The flow simulator provides, among other information, the flow pressure and temperature profile for a boundary condition provided by the user.

The calculated pressure and temperature profiles along the multiphase flow are expected to present errors compared to the values seen in the field. A common approach for reducing such deviations is to use adjustment factors on pressure drop and temperature drop. That is, once the pressure and temperature gradients are obtained by the flow simulator, a multiplicative factor is applied in order to reproduce the field data. For example, for a simulated pressure gradient along the production pipe $$\nabla P|_{pipe}^{sim},$$

multiplicative factor $\varphi_{\Delta P,pipe}$ is applied to obtain the final pressure gradient $\nabla P|_{pipe}$. The present invention is related to one-dimensional flow as it is the approach used in the vast majority of flow simulators. Therefore, $$\nabla P|_{pipe} = (dP/dL)_{pipe} = \varphi_{\Delta P,pipe}(dP/dL)_{pipe}^{sim} \tag{1}$$

Similarly, $$\nabla T|_{pipe} = (dT/dL)_{pipe} = \varphi_{\Delta T,pipe}(dT/dL)_{pipe}^{sim} \tag{2}$$

Traditionally, optimization of the adjustment factors of the flow simulation model was performed manually, by trial and error. That is, a value was proposed for the $\varphi_{\Delta P}$, for example, and an influence of the alteration on the simulation result was verified. After several attempts, the process was repeated, now for $\varphi_{\Delta T}$. If we consider, for example, that the adjustment factors can be different in the production column and in the subsea line, then there are four variables to be optimized: $\varphi_{\Delta P,column}$, $\varphi_{\Delta P,pipe}$, $\varphi_{\Delta T,column}$ and $\varphi_{\Delta T,pipe}$. It is important to emphasize that such an optimization is non-linear, since the pressure profile influences the temperature profile, and vice versa. It is noticed that this process may require considerable time spent by the Lift and Flow Engineer. Furthermore, the final result of optimization (adjusted model) cannot be as satisfactory as compared to that obtained with the method described in the present invention. Automated definition of form factors saves time and makes it easier to consider more items of the production history.

Document US20140343909A1 relates to a method for modeling a multiphase flow in a porous medium, wherein the transport phenomena are modeled by solving conventional transport equations, and wherein the settings of thermodynamic and/or geochemical equilibrium are not carried out by solving thermodynamic equations (thermodynamic "flashes") or geochemical equations, but by means of a neuron network.

Document U.S. Ser. No. 10/409,929B2 discloses a method for simulation of multiphase fluid flow in pipelines enabling determination of pressure drop, fluid volume fractions, and heat and mass transfer coefficients in multiphase pipeline flows.

Document U.S. Pat. No. 5,550,761A discloses a method for modelling steady state as well as transient multiphase flows such as hydrocarbon mixtures circulating in pipeline networks taking into account a set of variables defining fluid properties and flow patterns, as well as dimensions or slope angles of the pipelines.

The prior-art documents disclose methods for modeling or simulating multiphase fluid flows.

However, the prior arts are not able to correct systematic errors of properties in the flow of multiphase fluids, the systematic errors of the values of load loss and the temperature drop in the flow of multiphase fluids.

In view of the difficulties found in the cited state of the art, and for solutions to adjust flow models, there is a need to develop a technology capable of performing effectively and that is in accordance with the environmental and safety guidelines. The state of the art cited above does not provide the unique features that will be presented in detail below.

OBJECT OF THE INVENTION

It is one objective of the invention to provide a method capable of correcting systematic errors of properties in the flow of multiphase fluids, such as: systematic errors in values of flow pressure and temperature drop.

BRIEF DESCRIPTION OF THE INVENTION

The present invention consists of a method of automatic adjustment of multiphase flow models using the principle of least squares in the correction of the systematic error of the simulated values of pressure drop and temperature drop. This has been implemented and automated in the form of a computational algorithm and applied in the case study of an actual Production System using Marlim II simulator. For all four multiphase flow correlation sets considered, the adjustments followed each other stably, converging after a few iterations. At the end of the activity, the four sets were found to perform better than the best unadjusted set of correlations. In addition, the method provides consistent results, which is an advantage over the manual adjustment method.

Accordingly, the present invention has drastically reduced the time for optimizing the adjustment factors of flow models and has improved quality of the adjusted model as compared to the final model obtained with the manual adjustment. By better quality of the model is meant that the simulated results are closer to the measured results, that is, the model is more capable of representing the flow dynamics verified in the field. In cases with a high number of operating spots in the real system, reduction in the time required by the activity is even more significant.

BRIEF DESCRIPTION OF THE DRAWINGS

The present invention will be described in more detail below, with reference to the attached figures which, in a schematic and non-limiting manner of the scope of the invention, represent examples of embodiments. In the drawings.

DETAILED DESCRIPTION OF THE INVENTION

Below is a detailed description of a preferred embodiment of the present invention, which is given by way of example and is in no way limiting. Nevertheless, possible additional embodiments of the present invention still comprised by the essential and optional features below will be clear to a person skilled in the art from reading this description.

The Production System chosen is in the Cachalote field, in the south of the State of Espirito Santo, and is connected to the FPSO Capixaba. As a lifting method, the Continuous Gas-Lift (CGL) is used throughout the field, being injected at two depths. Other basic aspects of the system are listed in Table 1. The representative fluid of the field is a heavy oil, whose main properties are shown in Table 2.

TABLE 1

Basic aspects of the production system

| Unit | Value |
|---|---|
| Production pipe diameter [in] | 8 (F) , 6 (R) |
| Production pipe length [m] | 4900 |
| Water depth at WCT [m] | 1450 |
| Production column diameter [in] | 6625 |
| Depth measured at upper GLV [m] | 2000 |
| Depth measured at lower GLV [m] | 2200 |
| Depth measured at the PDG [m] | 2520 |

TABLE 2

Summary of fluid properties

| Property | Value |
|---|---|
| Oil Density [API] | 19 |
| Gas density [–] | 0.65 |
| Gas-Oil Ratio [$Sm^3/Sm^3$] | 70 |
| Bubble point at 56° C. [bar] | 255 |
| Dead oil viscosity at 30° C. [cP] | 320 |
| Dead oil viscosity at 50° C. [cP] | 95 |

Model calibration in Marlim II simulator was carried out based on 9 system operational conditions in a stabilized regime. These are recorded in Production Test Reports (PTRs), and represent a production period of approximately 28 months. Table 3 summarizes them.

TABLE 3

System operational conditions.

| Number | Liquid flow rate [$Sm^3/d$] | BSW [%] | Pressure on production choke [barg] | Injected gas flow rate [$Sm^3/d$] |
|---|---|---|---|---|
| 1 | 4150 | 0 | 27.1 | 269000 |
| 2 | 4140 | 13 | 20.0 | 216000 |
| 3 | 4350 | 19 | 13.9 | 257000 |
| 4 | 4360 | 32 | 13.9 | 261000 |
| 5 | 4300 | 38 | 12.5 | 254000 |
| 6 | 4180 | 40 | 12.7 | 261000 |
| 7 | 4150 | 46 | 12.6 | 258000 |
| 8 | 4190 | 44 | 11.8 | 257600 |
| 9 | 4160 | 46 | 12.0 | 264000 |

Figures 1A, 1B, 1C, 1D:
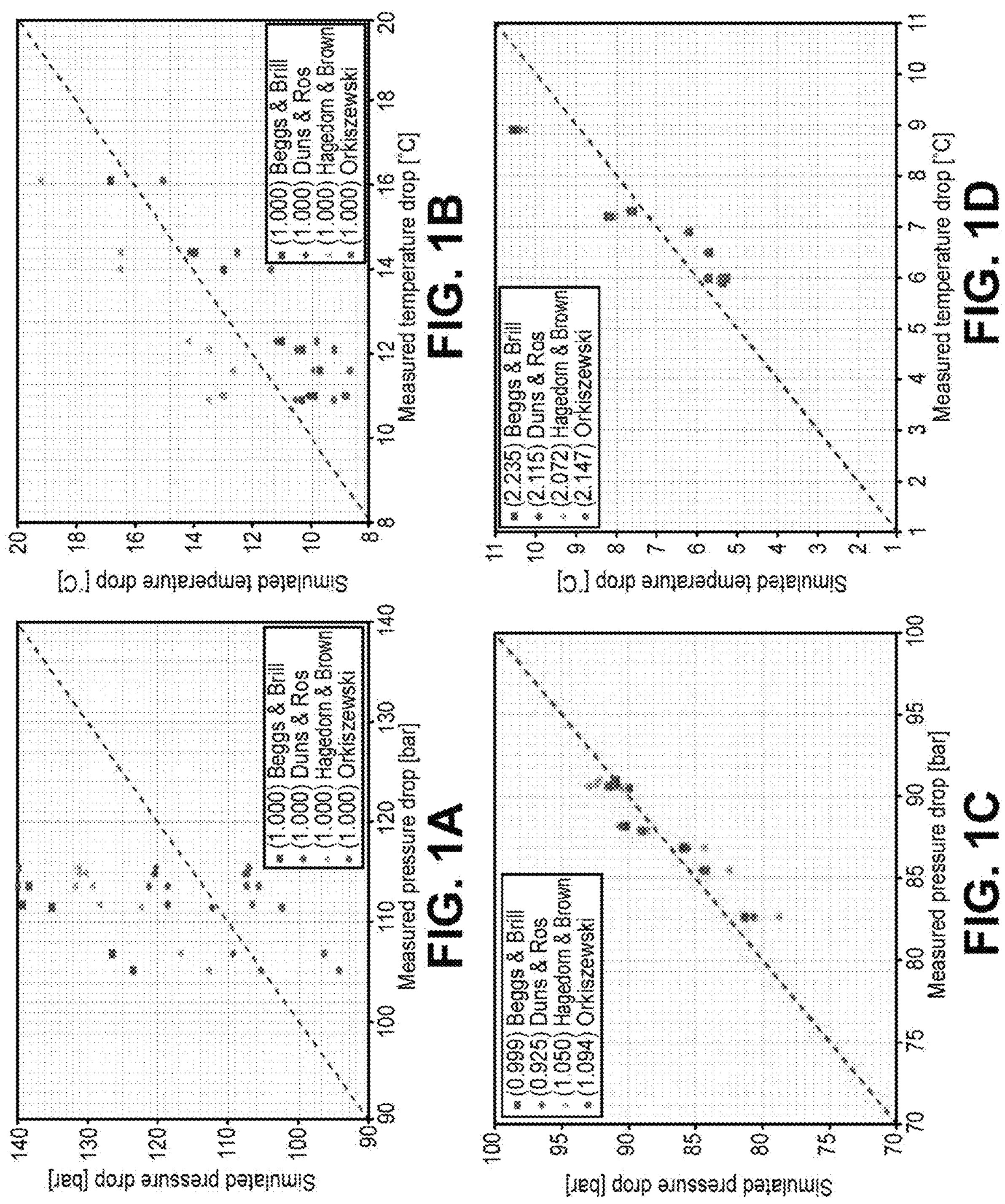
FIG. 1A illustrates the calibration of the simulated values of pressure drop in the production pipeline.
FIG. 1B illustrates the calibration of the simulated values of temperature drop in the production pipeline.
FIG. 1C illustrates the calibration of the simulated values of pressure drop in the production column.
FIG. 1D illustrates the calibration of the simulated values of temperature drop in the production pipeline. Model with no adjustment.

In total, four vertical flow correlations were tested, namely: Beggs & Brill (1973), Duns & Ros (1963), Hagedorn & Brown (1965) and Orkiszewski (1967). For the horizontal section, the Dukler, Eaton and Flanigan (1969) correlation was chosen, with a transition angle equal to 15°. Comparison of the simulated values with the respective operational readings of the Production System is made in FIG. 1.

The final calibration result is shown in Table 4. As can be seen, the Duns and Ros correlation was the one that achieved the best results among those tested.

TABLE 4

Average percentage errors of the flow model in MArlim II simulator, with no adjustment.

| Vertical flow correlation | Horizontal flow correlation | Average percentage error: ΔP in the production pipeline | ΔT in the production pipeline | ΔP in the production column | ΔT in the production column |
|---|---|---|---|---|---|
| Beggs & Brill | Duckler, Eaton & Flanigan | 21.3 | 10.0 | 1.6 | 60.1 |
| Duns & Ros | Dukler, Eaton & Flanigan | 4.3 | 8.6 | 2.8 | 51.7 |
| Hagedom & Brown | Dukler, Eaton & Flanigan | 12.8 | 16.8 | 5.3 | 55.2 |
| Orkiszewski | Dukler, Eaton & Flanigan | 7.5 | 18.8 | 10.5 | 50.0 |

Figures 2A, 2B, 2C, 2D:
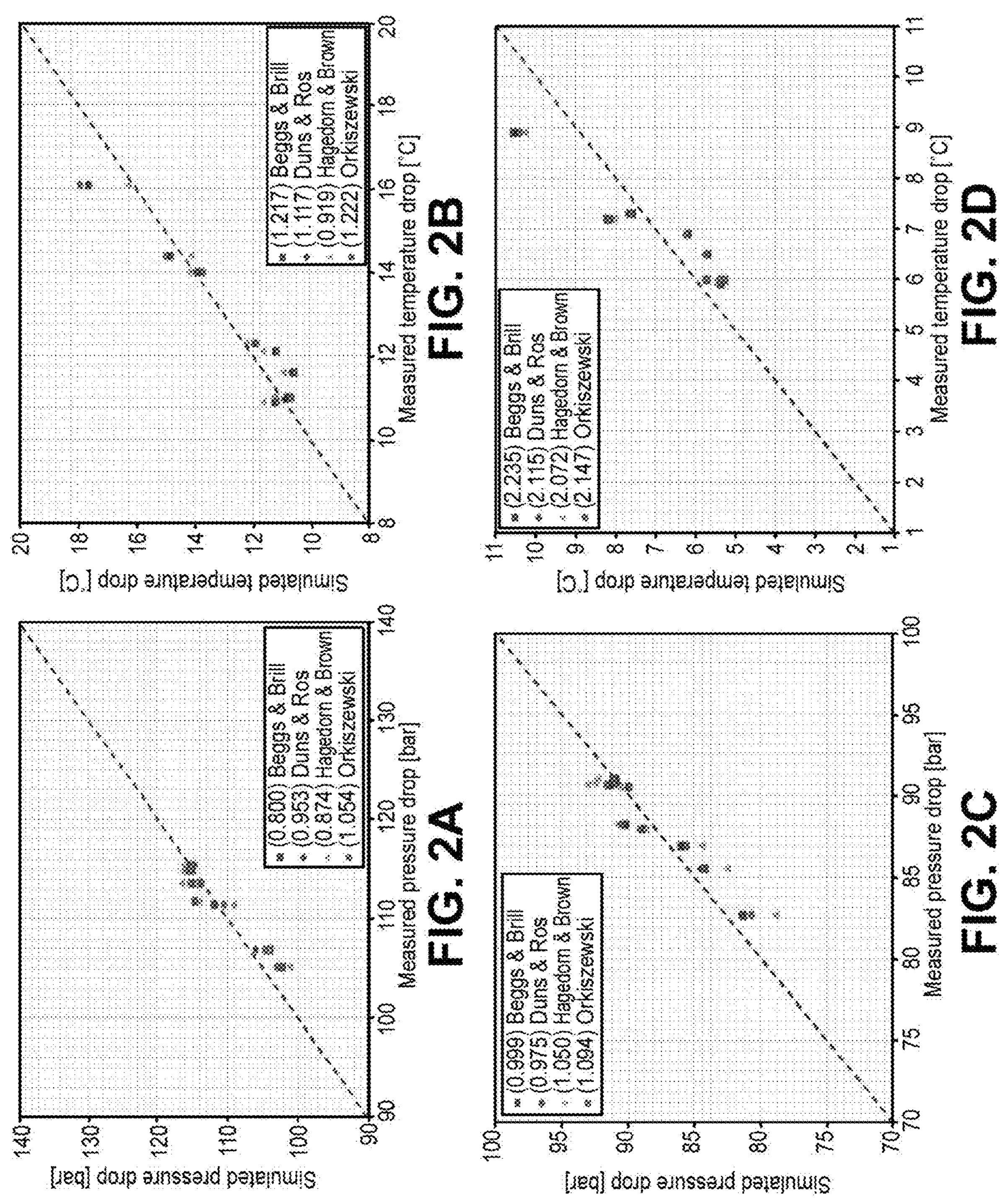
FIG. 2A illustrates the adjustment of the simulated values of pressure drop in the production pipeline, where adjustment factors are shown between parentheses.
FIG. 2B illustrates the adjustment of the simulated values of temperature drop in the production pipeline, where adjustment factors are shown between parentheses.
FIG. 2C illustrates the adjustment of the simulated values of pressure drop in the production column, where adjustment factors are shown between parentheses.
FIG. 2D illustrates the adjustment of the simulated values of temperature drop in the production pipeline using the proposed methodology, where adjustment factors are shown between parentheses.

Adjustment of the flow model was performed for the same set of correlations of the calibration step. Table 5 shows the adjustment factors calculated using Equations (12) to (15) in each iteration until convergence. A maximum admissible variation of less than 0.001 between two successive iterations was established as a criterion. The methodology proved to be stable. On average, 5 to 6 iterations were required to reach convergence of each of the analyzed cases. Comparison of the newly simulated values after adjustment with the respective operational readings is illustrated in FIG. 2. Note that dispersion of the results was drastically reduced compared to the previous comparison. The same conclusion is obtained by analyzing the average percentage errors of the adjusted model, as shown in Table 6. It is also noted that all four sets of correlations outperformed the best non-adjusted set.

TABLE 5

Calculation of factors in Equations (9) to (12), from the first iteration until adjustment convergence

| Vertical flow correlation | Horizontal flow correlation | Iteration | Adjustment factors: $(\hat{b}_{\Delta P_{data}})^{-1}$ | $(\hat{b}_{\Delta P_{data}})^{-1}$ | $(\hat{b}_{\Delta P_{column}})^{-1}$ | $(\hat{b}_{\Delta T_{column}})^{-1}$ |
|---|---|---|---|---|---|---|
| Beggs & Brill | Dukler, Eaton & Flanigan | 1 | 0.8245 | 1.0736 | 0.9891 | 2.4113 |
| | | 2 | 0.8041 | 1.2023 | 0.9966 | 2.2942 |
| | | 3 | 0.8006 | 1.2163 | 0.9982 | 2.2477 |
| | | 4 | 0.8004 | 1.2173 | 0.9985 | 2.2366 |
| | | 5 | 0.8004 | 1.2171 | 0.9986 | 2.2348 |
| | | 6 | 0.8004 | 1.2171 | 0.9986 | 2.2348 |
| Duns & Ros | Dukler, Eaton & Flanigan | 1 | 0.9629 | 1.0602 | 0.9754 | 1.9971 |
| | | 2 | 0.9539 | 1.1065 | 0.9746 | 2.1171 |
| | | 3 | 0.9529 | 1.1160 | 0.9747 | 2.1173 |
| | | 4 | 0.9527 | 1.1168 | 0.9748 | 2.1160 |
| | | 5 | 0.9525 | 1.1169 | 0.9748 | 2.1159 |
| Hagedorn & Brown | Dukler, Eaton & Flanigan | 1 | 0.8879 | 0.8598 | 1.0483 | 2.1589 |
| | | 2 | 0.8748 | 0.9135 | 1.0485 | 2.1013 |
| | | 3 | 0.8736 | 0.9187 | 1.0499 | 2.0780 |
| | | 4 | 0.8736 | 0.9190 | 1.0501 | 2.0731 |
| | | 5 | 0.8737 | 0.9188 | 1.0501 | 2.0725 |
| Orkiszewski | Dukler, Eaton & Flanigan | 1 | 1.0774 | 1.2040 | 1.1155 | 1.9367 |
| | | 2 | 1.0575 | 1.2025 | 1.0915 | 2.1320 |
| | | 3 | 1.0550 | 1.2189 | 1.0943 | 2.1511 |
| | | 4 | 1.0541 | 1.2215 | 1.0943 | 2.1482 |
| | | 5 | 1.0541 | 1.2220 | 1.0945 | 2.1469 |
| | | 6 | 1.0541 | 1.2220 | 1.0945 | 2.1466 |

TABLE 6

Average percentage errors of the flow model in Marlim II simulator, adjusted.

| Vertical flow correlation | Horizontal flow correlation | Average percentage error ΔP in the production pipeline | ΔT in the production pipeline | ΔP in the production column | ΔT in the production column |
|---|---|---|---|---|---|
| Beggs & Brill | Duckler, Eaton & Flanigan | 1.7 | 5.4 | 1.2 | 11.6 |
| Duns & Ros | Dukler, Eaton & Flanigan | 1.5 | 5.2 | 1.2 | 11.2 |
| Hagedom & Brown | Dukler, Eaton & Flanigan | 2.1 | 3.5 | 2.7 | 9.8 |
| Orkiszewski | Dukler, Eaton & Flanigan | 1.4 | 6.0 | 1.5 | 11.1 |

The method of the present invention is implemented in optimization systems of multiphase flow models in the company. As an example, the BR-SiOP system and the PYEE repository can be mentioned, which contain Python codes with algorithms that are useful for Lift and Flow Engineers. The method has been available internally at Petrobras since 2015. It is estimated that it has been successfully used hundreds of times since then. To the authors' knowledge, the method has never been published in conferences or journals external to Petrobras.

The method can be used to optimize adjustment factors of flow simulation models in onshore and offshore production and injection wellbores.

Figures 3A, 3B:
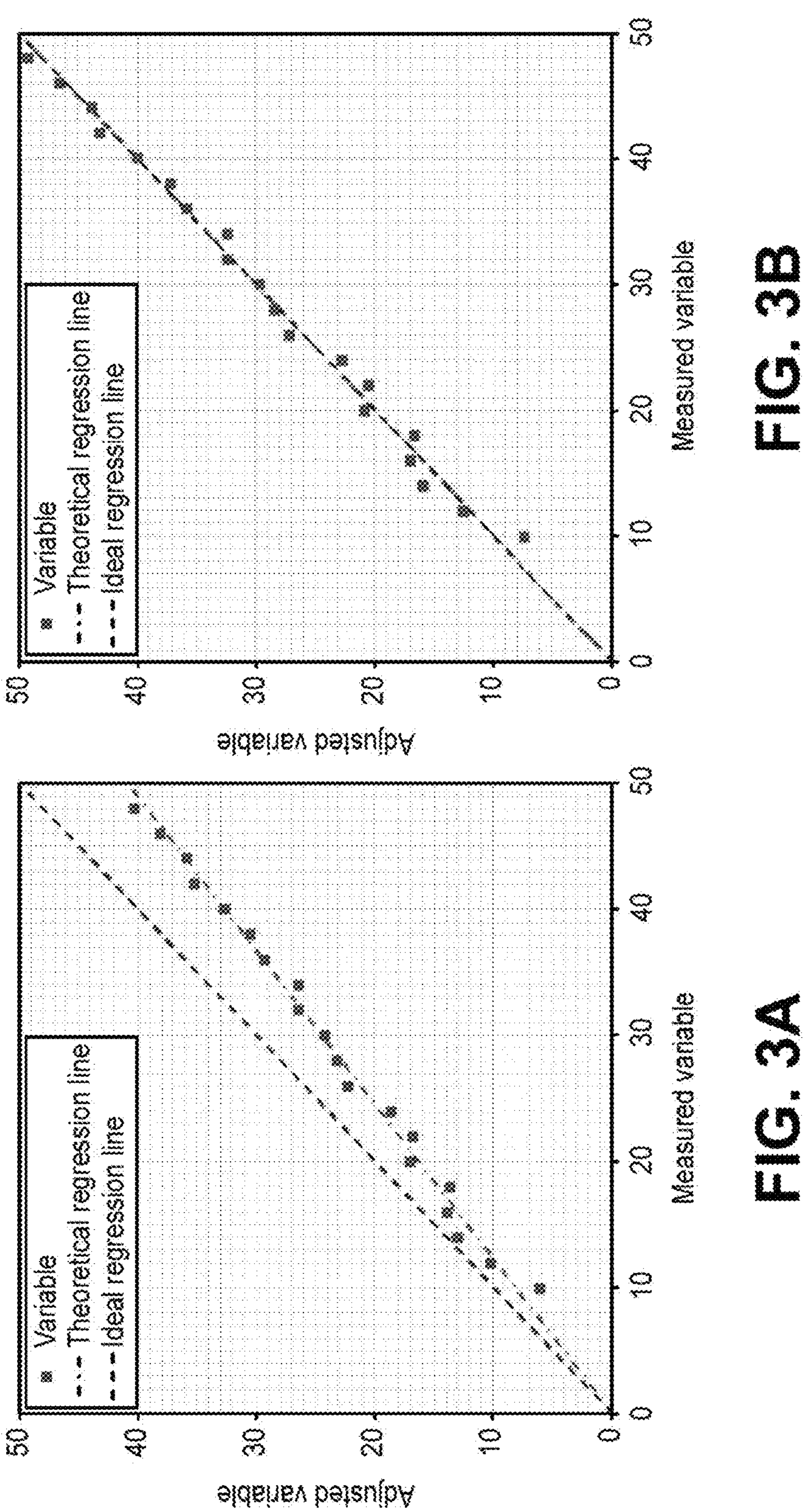
FIGS. 3A and 3B each illustrate an example of adjustment of simulated values in the flow model: displacement of the theoretical regression line to the ideal regression line.

The proposed adjustment methodology is equivalent to displaying, in a scatter plot, values of variables referring to the actual system on the x-axis, and those obtained by the flow model on the y-axis (see FIG. 3A).

The relationship between measured (x) and simulated (y) data is assumed to be linear for the purpose of simplifying the adjustment, being written as:

$$y=bx \tag{3}$$

where the slope b is estimated by $\hat{b}$ from a sample of (x, y) pairs. Thus, the Sample Regression Function (SRF) will be given by:

$$\hat{y}=\hat{b}x \tag{4}$$

and application of the principle of the least squares leads to imposing the condition $$\min\sum_{i=1}^{n} d_i^2 = \min\sum_{i=1}^{n}\left(y_i-\hat{b}x_i\right)^2 \tag{5}$$

Canceling the derivative with respect to b:

$$\frac{d}{db}\sum_{i=1}^{n}\left(y_i-\hat{b}x_i\right)^2=0 \tag{6}$$

$$-2\sum_{i=1}^{n}x_i\left(y_i-\hat{b}x_i\right)=0 \tag{7}$$

$$\sum_{i=1}^{n}x_i y_i=\hat{b}\sum_{i=1}^{n}x_i^2 \tag{8}$$

-continued $$\hat{b}=\frac{\sum_{i=1}^{n}x_i y_i}{\sum_{i=1}^{n}x_i^2} \tag{9}$$

Finally, the adjustment factor is defined as $$\varphi=\frac{1}{\hat{b}} \tag{10}$$

The systematic error correction step can be interpreted as a displacement of the SRF so that it coincides with the ideal regression line, as illustrated in FIG. 3B. This is achieved in a simple manner by $$y_{i,aj}=\varphi y_i,\ \forall\ 1\le i\le n \tag{11}$$

Adjustment of multiphase flow models must be applied simultaneously in the calculation of pressure and temperature drop in the pipeline and production column, thus totaling four variables if the TPT and PDG sensors are both functional. After simulating the n operational conditions of the real system, the slopes of the regression line are given, respectively, by $$\hat{b}_{\Delta P_{pipe}}=\frac{\sum_{i=1}^{n}\Delta P_{pipe,i}^{meas}\Delta P_{pipe,i}^{sim}}{\sum_{i=1}^{n}\left(\Delta P_{pipe,i}^{meas}\right)^2} \tag{12}$$

$$\hat{b}_{\Delta T_{pipe}}=\frac{\sum_{i=1}^{n}\Delta T_{pipe,i}^{meas}\Delta T_{pipe,i}^{sim}}{\sum_{i=1}^{n}\left(\Delta T_{pipe,i}^{meas}\right)^2} \tag{13}$$

$$\hat{b}_{\Delta P_{column}}=\frac{\sum_{i=1}^{n}\Delta P_{column,i}^{meas}\Delta P_{column,i}^{sim}}{\sum_{i=1}^{n}\left(\Delta P_{column,i}^{meas}\right)^2} \tag{14}$$

$$\hat{b}_{\Delta T_{column}}=\frac{\sum_{i=1}^{n}\Delta T_{column,i}^{meas}\Delta T_{column,i}^{sim}}{\sum_{i=1}^{n}\left(\Delta T_{column,i}^{meas}\right)^2} \tag{15}$$

Then, these values must be inverted and passed on to the flow simulator, so that, for each model section the pressure and temperature gradients calculated thereby are adjusted. It can be expressed mathematically as $$\frac{dP}{dL}\Big|_{pipe,i}^{aj}=\frac{1}{\hat{b}_{\Delta P_{pipe}}}\frac{dP}{dL}\Big|_{pipe,i}^{sim}=\varphi_{\Delta P_{pipe}}\frac{dP}{dL}\Big|_{pipe,i}^{sim} \tag{16}$$

$$\frac{dT}{dL}\Big|_{pipe,i}^{aj}=\frac{1}{\hat{b}_{\Delta T_{pipe}}}\frac{dT}{dL}\Big|_{pipe,i}^{sim}=\varphi_{\Delta T_{pipe}}\frac{dT}{dL}\Big|_{pipe,i}^{sim} \tag{17}$$

$$\frac{dP}{dL}\Big|_{column,i}^{aj}=\frac{1}{\hat{b}_{\Delta P_{column}}}\frac{dP}{dL}\Big|_{column,i}^{sim}=\varphi_{\Delta P_{column}}\frac{dP}{dL}\Big|_{column,i}^{sim} \tag{18}$$

$$\frac{dT}{dL}\Big|_{column,i}^{aj}=\frac{1}{\hat{b}_{\Delta T_{column}}}\frac{dT}{dL}\Big|_{column,i}^{sim}=\varphi_{\Delta T_{pipe}}\frac{dT}{dL}\Big|_{column,i}^{sim} \tag{19}$$

Due to the influence of pressure drop models on temperature drop models and vice versa, non-linearities arise, which transform Equations (12) to (15) into approximate expressions. Some iterations are necessary for variation of the coefficients be sufficiently small, when the adjustment convergence is finally verified.

It should be noted that if the TPT sensor is non-functional it will be impossible to distinguish errors in the pipeline from errors in the production column, and the calculated coefficients are only two. Also, if PDG is non-functional, the coefficients in the column cannot be calculated, only those in the pipe. Finally, if both sensors are non-functional, the error calculation (and subsequently, the model adjustment) cannot be performed.

Although not illustrated in the present invention, adjustment of pressure drop models in the service pipeline and IPR can be performed using this same methodology.

The invention claimed is:

1. An automated method for optimizing adjustment factors of a multiphase flow model, the method comprising:

arranging in a first scatter plot measured pressure values measured by a real oil production system on a first x-axis, and simulated pressure values simulated by the multiphase flow model on a first y-axis;

arranging in a second scatter plot measured temperature values measured by the real oil production system on a second x-axis, and simulated temperature values simulated by the multiphase flow model on a second y-axis;

calculating a first slope of a first regression line of the first scatter plot corresponding to a pressure drop and a second slope of a second regression line of the second scatter plot corresponding to a temperature drop in at least one of a pipeline or a production column;

inverting the first slope to obtain a first adjustment factor and calculating a first systematic error correction based on the first adjustment factor;

inverting the second slope to obtain a second adjustment factor and calculating a second systematic error correction based on the second adjustment factor;

automatically adjusting the multiphase flow model based on the first and second systematic error corrections; and simulating multiphase flow in the real oil production system using the adjusted multiphase flow model.

2. The method, according to claim 1, wherein a relationship between the measured pressure and temperature values and the simulated pressure and temperature values is assumed to be linear.

3. The method, according to claim 1, wherein each systematic error correction shifts the respective regression line so that the respective regression line coincides with an ideal regression line.

4. The method, according to claim 1, wherein each slope is calculated based on applying a principle of least squares.

5. The method, according to claim 1, wherein automatically adjusting the multiphase flow model based on the first and second systematic error corrections comprises adjusting the multiphase flow model based on the first systematic error correction and adjusting the multiphase flow model based on the second systematic error correction simultaneously.

6. The method, according to claim 1, wherein the multiphase flow model comprises a first model section that models the pipeline and a second model section that models the production column.

* * * * *